Feb. 7, 1950        E. W. MILLARD        2,497,032

AUTOMATIC SAFETY FLOW CONTROL

Filed July 31, 1944        2 Sheets-Sheet 1

INVENTOR.
Edgar W. Millard
BY
ATTORNEY

Feb. 7, 1950  E. W. MILLARD  2,497,032
AUTOMATIC SAFETY FLOW CONTROL
Filed July 31, 1944  2 Sheets-Sheet 2
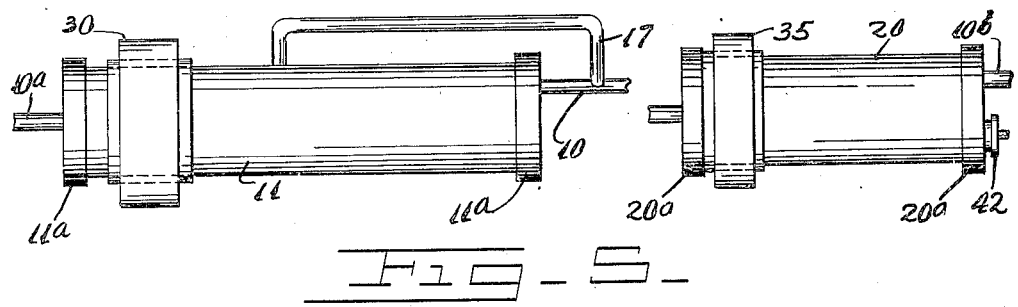
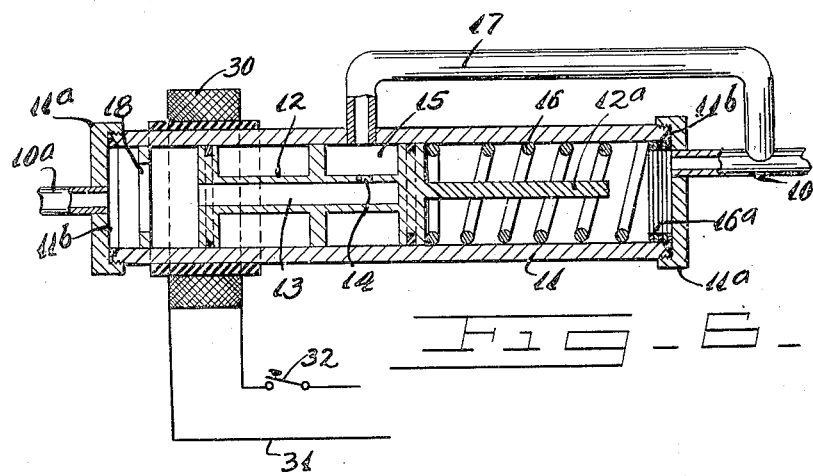
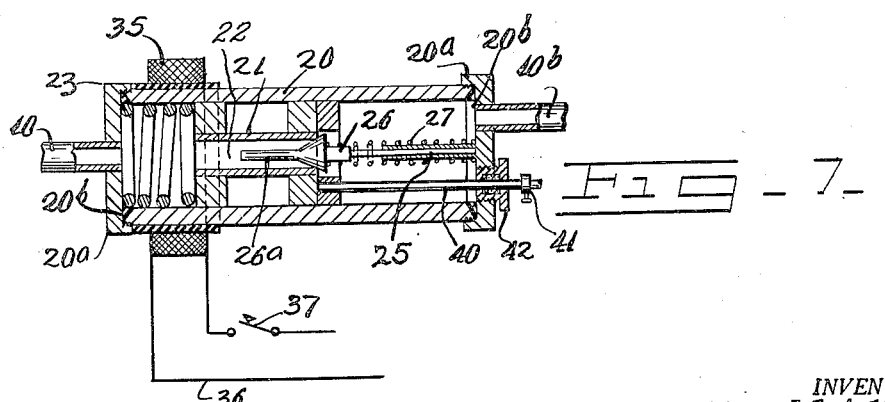
INVENTOR.
Edgar W. Millard
BY
ATTORNEY Patented Feb. 7, 1950

2,497,032

UNITED STATES PATENT OFFICE 2,497,032

AUTOMATIC SAFETY FLOW CONTROL

Edgar W. Millard, Elyria, Ohio

Application July 31, 1944, Serial No. 547,492

6 Claims. (Cl. 137—153)

This invention relates to new and useful improvements in an automatic safety flow control.

More specifically the invention proposes interposing a device in a pipeline for carrying fluid under pressure from a source to a point of consumption for accurately determining when a drop in pressure occurs due to a break in the pipe line and for stopping the flow of the liquid and prevent the loss thereof.

Still further, it is proposed to characterize the device by a cylinder connected in series with a pipeline adjacent the source of the fluid supply and provided with a cutoff piston slidably mounted in the cylinder and having a passage extending from its front end downstream to a chamber which connects with an auxiliary pipe line.

A further object of the invention proposes the provision of a resilient means for urging the piston towards the front of the cylinder in a manner to disconnect the passage of the cylinder from the auxiliary pipe line to discontinue the flow of liquid.

Still another object of the invention proposes the provision of a novel relief valve mounted in a second cylinder connected in series downstream of said first mentioned cylinder and with said pipe line in a manner to create a back pressure in the first named cylinder.

Still another object of this invention proposes the provision of a novel means for moving the cutoff piston to a forward starting position and still another means for opening the relief valve for testing purposes.

It is a further object of this invention to construct an automatic safety flow control which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 2 is a longitudinal sectional view of the second cylinder positioned in series with said pipeline upstream of said first named cylinder.

Fig. 5 is a view similar to Fig. 1 illustrating a modification of the invention.

Fig. 6 is a longitudinal sectional view of the cylinder at the left in Fig. 5.

Fig. 7 is a longitudinal sectional view of the cylinder at the right in Fig. 5.

Figure 1:
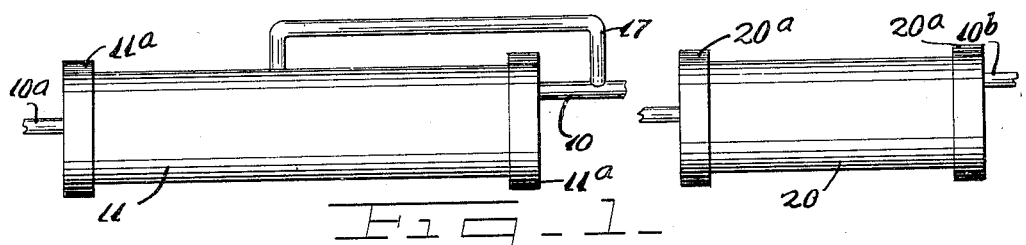
Fig. 1 is a side elevational view of an automatic safety flow control constructed in accordance with this invention.

The automatic safety flow control, according to this invention, is to be used in combination with a fluid pipeline 10 for conveying fluid under pressure from a source to a point of consumption. The device is characterized by a cylinder 11 with end caps 11a sealed by gaskets 11b connected in a series with a portion 10a of the pipe line 10. This cylinder 11 includes a cutoff piston 12 having packing or packing rings 12b which is slidably mounted therein and which is provided with a passage 13 extending from the front thereof and terminating in an opening 14 which leads to a peripheral chamber 15 formed around said cutoff piston 12.

Resilient means is provided for urging the cutoff piston 12 towards the front end of the cylinder 11. This resilient means is characterized by an expansion spring 16 positioned between the back end of the cutoff piston 12 and the back end wall of the cylinder 11. Spacer washers 16a which may be added to or removed make the tension of spring 16 adjustable.

An auxiliary pipeline 17 connects the side of the cylinder 11 with the pipeline 10 at a point immediately back of the cylinder 11. The pipeline 17 is provided for draining fluid from the chamber 15 to the pipe line 10 back of the cylinder 11.

The interior of the cylinder 11 is provided with a circular stop 18 with which the front end of the cutoff piston 12 is adapted to seat. This limits the complete forward extension of the cutoff piston 12 by the spring 16 and provides a space within the cylinder in the complete forward position of the piston in which fluid is adapted to enter to create a pressure for urging the cutoff piston to move rearwards against the action of the spring 16. In the most rearward position of the piston 12 the chamber 15 will be disaligned with the end of the auxiliary pipe 17 and prevent the flow of liquid. The piston 12 has a stop rod 12a engageable against one of the caps 11a for limiting sliding of said piston towards the rear of said cylinder 11.

A second cylinder 20 has end caps 20a and is connected in series with the pipeline 10 upstream of said cylinder 11. Packing material 20b prevents leakage past said end caps 20a. This second cylinder encloses a slidably mounted piston 21 which has a central passage 22 through which the fluid is adapted to pass. An expansion spring 23 urges the piston 21 against a circular stop 24 fixedly mounted within the cylinder 20 intermediate its ends. A tubular extension 25 projects from the rear end of the cylinder 20 internally of the cylinder. This tubular extension 25 is mounted on one of the caps 20a and slidably supports a valve member 26 which is adapted to seat itself upon the back end of the piston 21 for closing the passage 22. A spring 27 is coaxially wound upon the extension 25 and operates between the valve 26 and the back wall of the cylinder 20 for urging the valve into position on the end of the piston 22. Another tubular extension 25' from said cap 20ª encases said spring 27.

Figure 2:
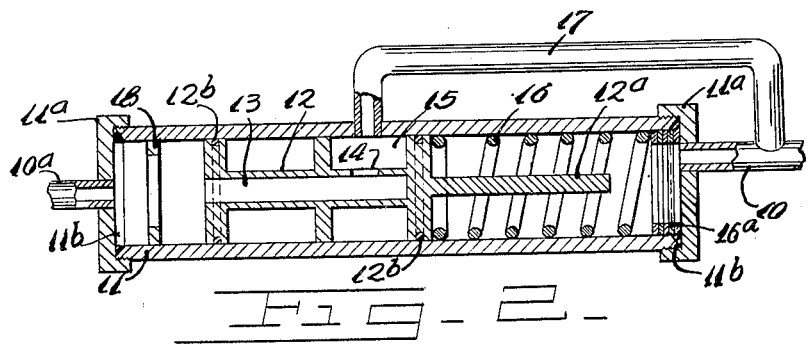
Fig. 2 is a longitudinal sectional view of the cylinder positioned in series with the pipeline.

The valve 26 is in the nature of the relief valve for creating a back pressure in the cylinder 11 to act against the back face of the piston 12 and cooperate with the pressure of the fluid against the front end thereof to retain the piston in the position shown in Fig. 2, against the action of the spring 16. The valve 26 has a front extension 26ª which projects into the passage 22. In this position of piston 12 a free passage for the fluid will be created through the auxiliary pipe line 17 so that the fluid may freely pass from its source to its point of consumption. In passing through the cylinder 20 the fluid will slightly unseat the valve 26 from the end of the piston 21, the valve 26 interfering with a free passage of the fluid to create a back pressure in the cylinder 11 but it will not interfere completely with the passage of fluid to the terminal portion 10ᵇ of the pipeline 10 and the point of consumption.

Figure 3:
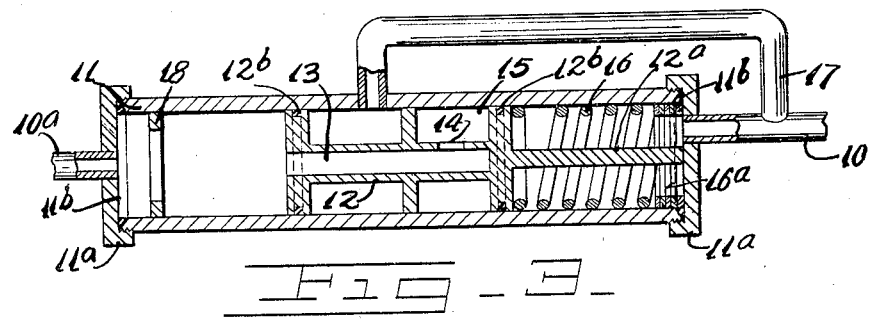
Fig. 3 is a view similar to Fig. 2 but illustrating a shifted position of the parts.
Figure 4:
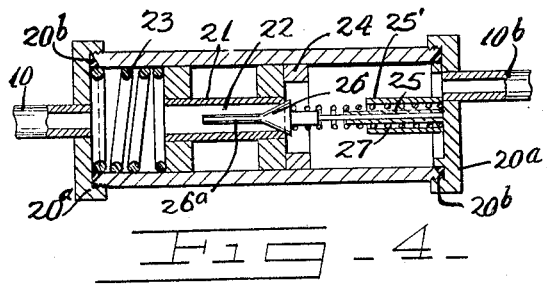

In the event that a break should occur in the pipeline 10 between the cylinders 11 and 20, the valve 26 will immediately seat itself upon the piston 21 closing the passage 22 and the fluid will start discharging from the break in the pipeline 10. This will disturb the back pressure in the cylinder 11 and the pressure of the fluid entering the cylinder 11 will push piston 12 into the position shown in Fig. 3. This will be so since the pressure exerted by fluid exceeds the pressure exerted by the expansion spring 16. When the piston reaches the position shown in Fig. 3 the end of the auxiliary pipeline will no longer be connected with the chamber 15 and the passage of fluid from the pipeline 10 will be stopped. The device at the point of consumption will cease to operate indicating a break in the pipeline 10 and the device may not again be operated until the break has been repaired. This device will automatically stop the flow of liquid until the break is corrected to prevent an excessive loss of fluid from the break. Any excessive back pressure in the portion 10ᵇ of the pipe line 10 will move the piston 21 away from the valve 26 opening the passage through the cylinder 20 and permitting the back pressure to exhaust itself into the rear of the cylinder 11. The valve 12 will be forced forwards against the stop 18, thus cutting off the pipe line 17 for stopping the flow of fluid.

The pipeline 10 may have a number of branches each of which is provided with one of said cylinders 20.

In the modification of the invention shown in Figs. 5 and 6 a means is provided upon the cylinder 11 for moving the cutoff piston 12 forwards to a starting position to permit the flow of fluid to be stopped when desired. This means comprises an electric solenoid 30 mounted on the front of the cylinder 11. This solenoid 30 is connected in a circuit 31 controlled by a manually closable switch 32.

The cylinder 11 in this form of the invention is constructed of non-magnetic material while the piston 12 is constructed of magnetic material to be urged forwards when the switch 32 is closed energizing the solenoid 30.

Means is provided upon the cylinder 20 for unseating the relief volve 26 for testing purposes. This means is characterized by a solenoid 35 mounted upon the front end of the cylinder 20 and connected in a circuit 36 controlled by a manually closable switch 37.

The cylinder 20 is likewise formed of non-magnetic material while the piston 21 is formed of magnetic material to be urged forwards against the action of the spring 23 when the solenoid 35 is energized. In this forward position, the valve 26 will be open permitting a free passage of the fluid through the passage 22 as well as an excessive back pressure, to decrease the back pressure in the cylinder 11 and permit the piston 12 to move to a position to stop the flow of fluid through the auxiliary pipeline 17.

A drain pipe 40 extending from the cylinder 20 is provided with a drain cock 41. A packing gland 42 is mounted on one of said end caps 20ª and about said drain pipe 40.

In other respects this form of the invention is similar to that previously shown and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a fluid pipeline, a cylinder connected at its opposite ends in series with said pipeline and having its front end upstream, a cutoff piston slidably mounted in said cylinder and having a passageway from its front end to a peripheral chamber formed in said piston, resilient means urging said piston towards the front of said cylinder, an auxiliary pipeline from the side of said cylinder to said pipeline at a point immediately rear of said cylinder for draining fluid from said peripheral chamber when said piston is in a position in which said peripheral chamber is aligned with the end of said auxiliary pipeline which is connected to the side of said cylinder, a second cylinder connected in series with said pipeline and located downstream of said first named cylinder, a piston in said second cylinder, resilient means for urging said latter piston rearwards, and a spring loaded relief valve in and biased in an upstream direction of said second cylinder and having its seat on said latter mentioned piston, whereby when a break occurs in said pipeline at a point between said cylinders said first named piston will be moved rearwards from said position and will cut off the flow of fluid through said auxiliary pipe line.

2. In combination with a fluid pipeline, a cylinder connected at its opposite ends in series with said pipeline and having its front end upstream, a cutoff piston slidably mounted in said cylinder and having a passageway from its front end to a peripheral chamber formed in said piston, resilient means urging said piston towards the front of said cylinder, an auxiliary pipeline from the side of said cylinder to said pipeline at a point immediately rear of said cylinder for draining fluid from said peripheral chamber when said piston is in a position in which said peripheral chamber is aligned with the end of said auxiliary pipeline which is connected to the side of said cylinder; a second cylinder connected in series with said pipeline and located downstream of said first named cylinder, a piston in said second cylinder, resilient means for urging said latter piston rearwards, and a spring loaded relief valve in and biased in an upstream direction of said second cylinder and having its seat on said latter mentioned piston, whereby when a break occurs in said pipeline at a point between said cylinders said first named piston will be moved rearwards from said position and will cut off the flow of fluid through said auxiliary pipe line, a stop in the front portion of said first named cylinder for said first named piston, whereby when said first named piston is moved against said stop from said position it cuts off the flow of fluid through said auxiliary pipeline.

3. In combination with a fluid pipeline, a cylinder connected in series with said pipeline and having its front end upstream, a cutoff piston slidably mounted in said cylinder and having a passageway from its front end to a peripheral chamber formed in said piston, resilient means urging said piston towards the front of said cylinder, an auxiliary pipeline from the side of said cylinder to said pipeline at a point immediately rear of said cylinder for draining fluid from said peripheral chamber when said piston is in a position in which said peripheral chamber is aligned with the end of said auxiliary pipeline which is connected to the side of said cylinder; a second cylinder connected in series with said pipeline and located downstream of said first named cylinder, a piston in said second cylinder, resilient means for urging said latter piston rearwards, and a spring loaded relief valve in and biased in an upstream direction of said second cylinder and having its seat on said latter mentioned piston, whereby when a break occurs in said pipeline at a point between said cylinders said first named piston will be moved rearwards from said position and will cut off the flow of fluid through said auxiliary pipe line, a stop in the front portion of said first named cylinder for said first named piston, whereby when said first named piston is moved against said stop from said position it cuts off the flow of fluid through said auxiliary pipeline, and manually controllable means for moving said piston against said stop.

4. In combination with a fluid pipeline, a cylinder connected in series with said pipeline and having its front end upstream, a cutoff piston slidably mounted in said cylinder and having a passageway from its front end to a peripheral chamber formed in said piston, resilient means urging said piston towards the front of said cylinder, an auxiliary pipeline from the side of said cylinder to said pipeline at a point immediately rear of said cylinder for draining fluid from said peripheral chamber when said piston is in a position in which said peripheral chamber is aligned with the end of said auxiliary pipeline which is connected to the side of said cylinder; a second cylinder connected in series with said pipeline and located downstream of said first named cylinder, a piston in said second cylinder, resilient means for urging said latter piston rearwards, and a spring loaded relief valve in and biased in an upstream direction of said second cylinder and having its seat on said latter mentioned piston, whereby when a break occurs in said pipeline at a point between said cylinders said first named piston will be moved rearwards from said position and will cut off the flow of fluid through said auxiliary pipe line, a stop in the front portion of said first named cylinder for said first named piston, whereby when said first named piston is moved against said stop from said position it cuts off the flow of fluid through said auxiliary pipeline, and manually controllable means for moving said piston against said stop, including solenoid means for moving said piston.

5. In combination with a fluid pipeline, a cylinder connected in series with said pipeline and having its front end upstream, a cutoff piston slidably mounted in said cylinder and having a passageway from its front end to a peripheral chamber formed in said piston, resilient means urging said piston towards the front of said cylinder to said pipeline at a point immediately rear of said cylinder for draining fluid from said peripheral chamber when said piston is in a position in which said peripheral chamber is aligned with the end of said auxiliary pipeline which is connected to the side of said cylinder; a second cylinder connected in series with said pipeline and located downstream of said first named cylinder, a piston in said second cylinder, resilient means for urging said latter piston rearwards, and a spring loaded relief valve in and biased in an upstream direction of said cylinder and having its seat on said latter mentioned piston, whereby when a break occurs in said pipeline at a point between said cylinders said first named piston will be moved rearwards from said position and will cut off the flow of fluid through said auxiliary pipe line, and manually controllable means for opening said relief valve.

6. In combination with a fluid pipeline, a cylinder connected in series with said pipeline and having its front end upstream, a cutoff piston slidably mounted in said cylinder and having a passageway from its front end to a peripheral chamber formed in said piston, resilient means urging said piston towards the front of said cylinder, an auxiliary pipeline from the side of said cylinder to said pipeline at a point immediately rear of said cylinder for draining fluid from said peripheral chamber when said piston is in a position in which said peripheral chamber is aligned with the end of said auxiliary pipeline which is connected to the side of said cylinder; a second cylinder connected in series with said pipeline and located downstream of said first named cylinder, a piston in said second cylinder, a resilient means for urging said latter piston rearwards, and a spring loaded relief valve in and biased in an upstream direction of said cylinder and having its seat on said latter mentioned piston, whereby when a break occurs in said pipeline at a point between said cylinders said first named piston will be moved rearwards from said position and will cut off the flow of fluid through said auxiliary pipe line, and manually controllable means for opening said relief valve, including solenoid means for moving said second named piston.

EDGAR W. MILLARD.

REFERENCES CITED

The following references are of record in the file of this patent:

UNITED STATES PATENTS

| Number | Name | Date |
|---|---|---|
| 1,045,693 | Gillman | Nov. 26, 1912 |
| 2,095,560 | Vickers | Oct. 12, 1937 |

FOREIGN PATENTS

| Number | Country | Date |
|---|---|---|
| 140,689 | Great Britain | of 1920 |